(12) United States Patent
Seo (10) Patent No.: US 7,428,908 B2
(45) Date of Patent: Sep. 30, 2008

(54) FASTENER FOR ASSEMBLING TRUSS BARS IN A COLLAPSIBLE CANOPY FRAME

(75) Inventor: Dong Woog Seo, Taegu (KR)

(73) Assignee: Caravan Canopy International, Inc., Compton, CA (US)

( * ) Notice: Subject to any disclaimer, the term of this patent is extended or adjusted under 35 U.S.C. 154(b) by 541 days.

(21) Appl. No.: 10/871,961

(22) Filed: Jun. 18, 2004

(65) Prior Publication Data
US 2005/0005538 A1 Jan. 13, 2005

(30) Foreign Application Priority Data
Jun. 19, 2003 (KR) ............ 20-2003-0019414

(51) Int. Cl.
*E04H 15/50* (2006.01)
*E04H 15/32* (2006.01)
(52) U.S. Cl. ............ 135/145; 135/131; 135/120.3
(58) Field of Classification Search ............ 135/145, 135/126, 128, 129, 135, 120.3; 403/161, 403/162; 153/141–145; 52/641
See application file for complete search history.

(56) References Cited

U.S. PATENT DOCUMENTS

| | | | | |
|---|---|---|---|---|
| 3,611,861 A | * | 10/1971 | Schulze | 411/508 |
| 3,865,437 A | * | 2/1975 | Crosby | 299/107 |
| 4,086,014 A | * | 4/1978 | Jalaguier | 411/514 |
| 4,649,947 A | | 3/1987 | Tury et al. | |
| D291,864 S | * | 9/1987 | Hill | D8/354 |
| 5,035,852 A | * | 7/1991 | Land et al. | 376/353 |
| 5,121,765 A | | 6/1992 | MacMorris, Jr. | |
| 5,167,100 A | | 12/1992 | Krishnapillai | |
| 5,244,001 A | | 9/1993 | Lynch | |
| 5,275,188 A | * | 1/1994 | Tsai | 135/97 |
| 5,452,876 A | | 9/1995 | Hatcher | |
| 5,701,923 A | | 12/1997 | Losi, Jr. et al. | |

(Continued)

FOREIGN PATENT DOCUMENTS

GB 2 404 932 2/2005

OTHER PUBLICATIONS

International Search Report of International Application No. PCT/US04/19556, dated Sep. 9, 2005.

*Primary Examiner*—David R Dunn
*Assistant Examiner*—Danielle N Jackson
(74) *Attorney, Agent, or Firm*—Christie, Parker & Hale, LLP (57) ABSTRACT

A collapsible canopy frame is provided that includes a first truss bar having a surface that defines an opening; a second truss bar having a surface that defines an opening that is aligned with the first truss bar opening; and a connector assembly that pivotally connects the first truss bar to the second truss bar. The connector assembly includes a locking plate at a second end of the connector assembly having a base that defines first and second surfaces with an opening extending therebetween, wherein the first base surface abuts the second truss bar; and a fastener having a main body that extends through each of the first and second truss bar openings and the locking plate base opening. The fastener also includes spaced apart first and second arms each having a shoulder that laterally extends from the main body to abut the second base surface of the locking plate to pivotally connect the first truss bar to the second truss bar.

21 Claims, 4 Drawing Sheets

U.S. PATENT DOCUMENTS

| | | | |
|---|---|---|---|
| 5,794,640 A * | 8/1998 | Jang | 135/131 |
| 5,797,412 A | 8/1998 | Carter | |
| 6,112,757 A | 9/2000 | Tseng | |
| 6,126,356 A * | 10/2000 | Russell | 403/24 |
| 6,173,726 B1 | 1/2001 | Talmadge | |
| 6,206,020 B1 | 3/2001 | Lynch | |
| 6,240,940 B1 | 6/2001 | Carter | |
| 6,374,843 B1 | 4/2002 | Zou | |
| 6,430,887 B1 | 8/2002 | Daudet | |
| 6,496,372 B1 * | 12/2002 | Davison et al. | 361/704 |
| 6,508,262 B1 * | 1/2003 | Takayama | 135/145 |
| 6,526,634 B1 * | 3/2003 | Hsieh | 24/458 |
| 6,681,786 B2 * | 1/2004 | Ju | 135/120.3 |
| 6,779,538 B2 * | 8/2004 | Morgante et al. | 135/128 |

* cited by examiner

FASTENER FOR ASSEMBLING TRUSS BARS IN A COLLAPSIBLE CANOPY FRAME

CROSS-REFERENCE TO RELATED APPLICATION(S)

This application claims priority to and the benefit of Korean Utility Model Application No. 20-2003-0019414 filed on Jun. 19, 2003 in the Korean Intellectual Property Office, now registered as Utility Model Registration No. 2003-25662-0000 on Aug. 26, 2003, the entire content of which is incorporated herein by reference.

FIELD OF THE INVENTION

The present invention relates to a fastener for assembling truss bars in a collapsible canopy frame and to a method of assembling truss bars in a collapsible canopy frame.

BACKGROUND

Conventional collapsible canopy frames typically include multiple side poles disposed in a predetermined configuration. Typically each pair of adjacent side poles is connected and supported by an edge scissor assembly. Each edge scissor assembly is movable between an extended position and a retracted position, such that the collapsible canopy frame as a whole is movable between an extended position (where the collapsible canopy frame forms a stable structure for supporting a canopy covering) and a retracted position (where the collapsible canopy frame is collapsed for ease of transport.)

For additional support, many collapsible canopy frames include inner scissor assemblies that connect the edge scissor assemblies to a center pole. Typically, each edge scissor assembly and each inner scissor assembly includes one or more scissor units. Each scissor unit includes two pivotally connected truss bars. Typically, these truss bars are pivotally connected by the use of nut and bolt combinations. For example, such a coupling is typically formed by aligning respective holes in the truss bars; inserting a bolt through the respective holes; and threadingly connecting a nut to the bolt until a desired tightness is achieved.

However, this process is undesirably time consuming. In addition, it is often difficult for the assembler to determine how tightly the nut is to be fitted to the bolt often relying on his personal experience and judgment. Accordingly, a need exists for an improved fastener for pivotally connecting truss bars in a collapsible canopy frame and to a method of assembling truss bars in a collapsible canopy frame.

SUMMARY

In an exemplary embodiment of the present invention, a collapsible canopy frame is provided that includes a first truss bar having a surface that defines an opening; a second truss bar having a surface that defines an opening that is aligned with the first truss bar opening; and a connector assembly that pivotally connects the first truss bar to the second truss bar. The connector assembly includes a locking plate at a second end of the connector assembly having a base that defines first and second surfaces with an opening extending therebetween, wherein the first base surface abuts the second truss bar; and a fastener having a main body that extends through each of the first and second truss bar openings and the locking plate base opening. The fastener also includes spaced apart first and second arms each having a shoulder that laterally extends from the main body to abut the second base surface of the locking plate to pivotally connect the first truss bar to the second truss bar.

In another exemplary embodiment of the present invention, the above described assembly further includes an end plate at a first end of the connector assembly having a base that is connected to the fastener and laterally extends from the fastener to abut the first truss bar and each arm further includes an angled portion extending from a tip of a corresponding one of the arms to an edge of a corresponding one of the shoulders to form a ramp.

In yet another exemplary embodiment of the present invention, a method of pivotally connecting a first truss bar to a second truss bar in a collapsible canopy frame is provided that includes forming an opening in a first truss bar; forming an opening in a second truss bar that is aligned with the opening in the first truss bar; and providing a connector assembly that pivotally connects the first truss bar to the second truss bar. The connector assembly includes an end plate having a base at a first end of the connector; a fastener extending from the base of the end plate and including a main body and spaced apart first and second arms each having a shoulder that laterally extends from the main body; and a locking plate at a second end of the connector assembly having a base that defines first and second surfaces having an opening extending therebetween. The method further includes inserting the fastener arms into and through each of the first and second truss bar openings and the locking plate base opening, such that the end plate base abuts the first truss bar, the locking plate base first surface abuts the second truss bar, and the fastener shoulders abut the locking plate base second surface to pivotally connect the first truss bar to the second truss bar.

BRIEF DESCRIPTION OF THE DRAWINGS

Novel features in exemplary embodiments of the present invention will be better understood by reference to the following detailed description when considered in conjunction with the accompanying drawings wherein.

DETAILED DESCRIPTION

As shown in FIGS. 1-6, the present invention is directed to a fastener for pivotally connecting truss bars in a collapsible canopy frame and to a method of assembling truss bars in a collapsible canopy frame.

Figure 1:
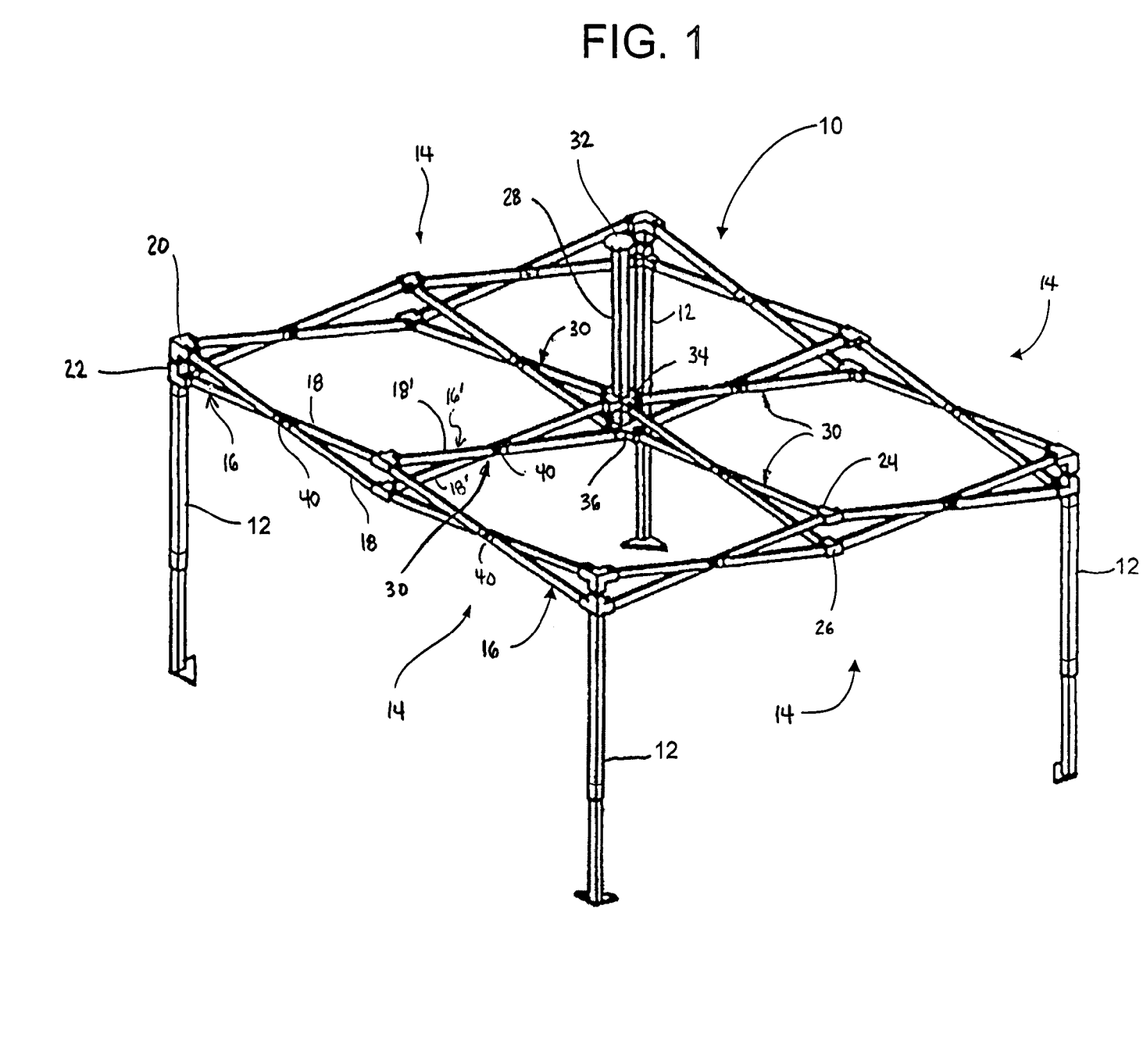
FIG. 1 is a perspective view of a collapsible canopy frame according to an exemplary embodiment of the present invention, shown in an expanded position.

FIG. 1 shows a collapsible canopy frame 10 according to an exemplary embodiment of the present invention. As shown, the collapsible canopy frame 10 includes four side poles 12 arranged in a generally rectangular or square configuration. In other embodiments, however, the collapsible canopy frame 10 may include any appropriate number of side poles 12 arranged in any appropriate configuration, such as pentagonal, hexagonal or octagonal, among other appropriate configurations.

Each pair of adjacent side poles 12 is connected to and supported by an edge scissor assembly 14. In the depicted embodiment, each edge scissor assembly 14 includes two scissor units 16. However, in other embodiments, each edge scissor assembly 14 may include any appropriate number of scissor units 16. Each scissor unit 16 includes two pivotally connected truss bars 18 that move about a pivot in a scissor-like manner between an expanded position and a retracted position.

An upper end of each edge scissor assembly 14 is pivotally connected to a corresponding one of the side poles 12 through a side pole upper mounting bracket 20, and a lower end of each edge scissor assembly 14 is pivotally connected to a corresponding one of the side poles 12 through a side pole lower mounting bracket 22. In one embodiment, each upper mounting bracket 20 is fixedly mounted at a top end of a corresponding one of the side poles 12 and each lower mounting bracket 22 is disposed in surrounding relation to a corresponding one of the side poles 12 and is slidably mounted thereon.

Adjacent scissor units 16 in each edge scissor assembly 14 are also pivotally coupled to each other. For example, in one embodiment the upper ends of adjacent scissor units 16 in each edge scissor assembly 14 are pivotally coupled to an edge scissor assembly upper mounting bracket 24 and the lower ends of adjacent scissor units 16 in each edge scissor assembly 14 are pivotally coupled to an edge scissor assembly lower mounting bracket 26.

In one embodiment, such as that shown in FIG. 1, each edge scissor assembly 14 is coupled to and supports a center pole 28 through an inner scissor assembly 30. The center pole 28 is disposed generally at the center of the collapsible canopy frame 10 and has a head member 32, such as a convex shaped head member, which supports a canopy cover (not shown).

In the depicted embodiment, each inner scissor assembly 30 includes one scissor unit 16'. However, in other embodiments, each inner scissor assembly 30 may include any appropriate number of scissor units 16'. As with the edge scissor assembly 14, each scissor unit 16' in each inner scissor assembly 30 includes two pivotally connected truss bars 18' that move about a pivot in a scissor-like manner between an expanded position and a retracted position.

Each inner scissor assembly 30 is pivotally coupled to a corresponding one of the edge scissor assemblies 14 through the upper and lower mounting brackets 24 and 26. For example, in one embodiment the upper ends of each inner scissor assembly 30 are pivotally coupled to the edge scissor assembly upper mounting bracket 24 and the lower ends of each inner scissor assembly 30 are pivotally coupled to the edge scissor assembly lower mounting bracket 26.

Each inner scissor assembly 30 is also pivotally mounted to the center pole 28. In one embodiment, each inner scissor assembly 30 is pivotally mounted to the center pole 28 through upper and lower center pole mounting brackets 34 and 36. As shown in the embodiment of FIG. 1, an upper end of each inner scissor assembly 30 is pivotally mounted to the upper center pole mounting bracket 34 and a lower end of each inner scissor assembly 30 is pivotally mounted to the lower center pole mounting bracket 36. In one embodiment, the lower center pole mounting bracket 36 is fixedly mounted at a bottom end of the center pole 28 and the upper center pole mounting bracket 34 is disposed in surrounding relation to the center pole 28 and is slidably mounted thereon.

Figure 2:
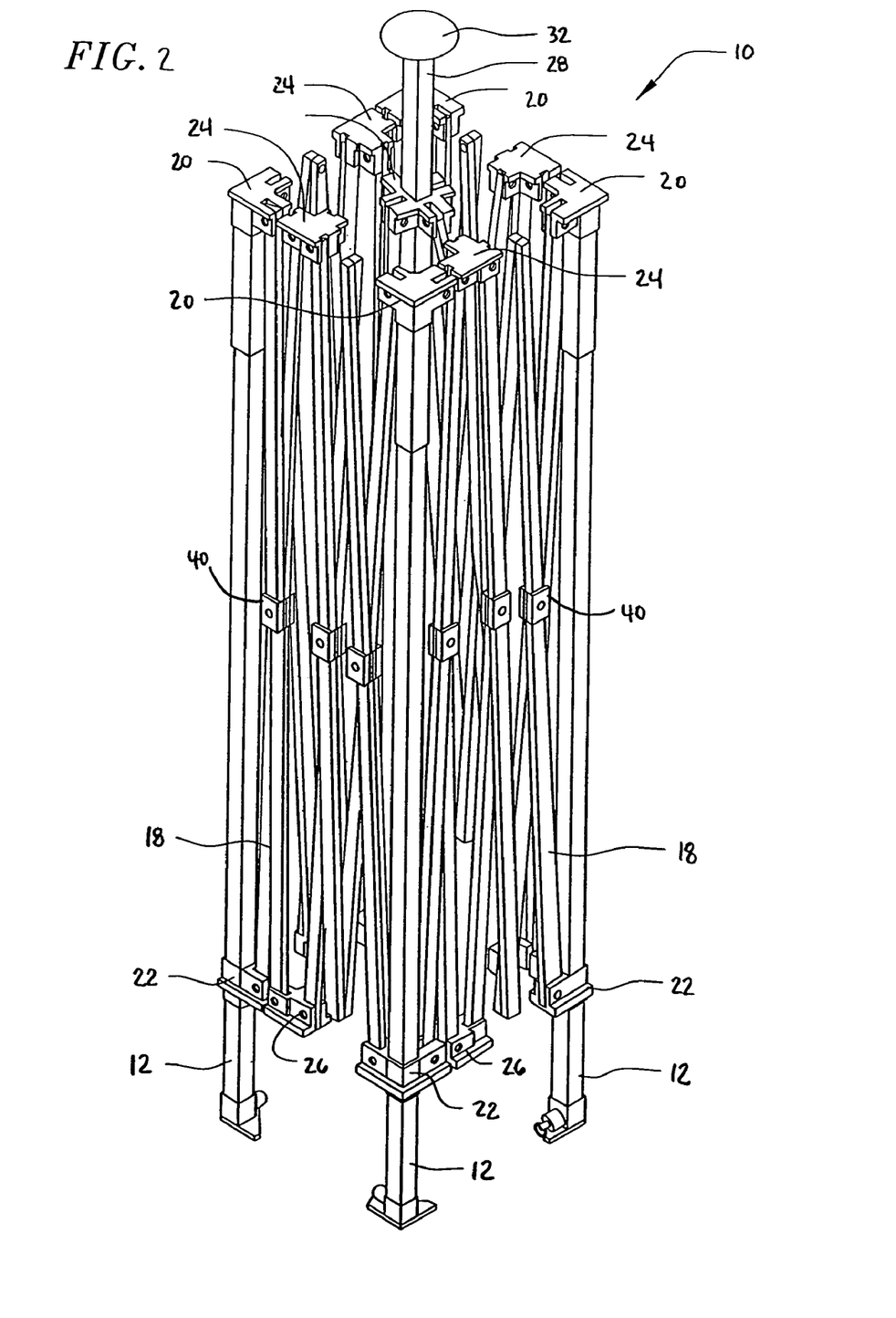
FIG. 2 is a perspective view of the collapsible canopy frame of FIG. 1, shown in a retracted position.

When the collapsible canopy frame 10 according to the present invention is constructed as described above, the collapsible canopy frame 10 is moveable between an expanded position (forming a stable portable structure as shown in FIG. 1), and a retracted position (forming a compacted structure for ease of transport as shown in FIG. 2.) In one embodiment, the connection of each edge scissor assembly 14 to corresponding ones of the side pole upper and lower mounting brackets 20 and 22; the connection of each scissor unit 16 in each edge scissor assembly 14 to corresponding ones of the edge scissor assembly upper and lower mounting brackets 24 and 26; the connection of the inner scissor assembly 30 to corresponding ones of the edge scissor assembly upper and lower mounting brackets 24 and 26; and the connection of the inner scissor assembly 30 to the upper and lower center pole mounting brackets 34 and 36 are accomplished by use of any one of the embodiments of the fastener as described in U.S. patent application Ser. No. 10/847,831, entitled "Fastener for Assembling Connecting Parts of a Collapsible Canopy Frame" filed on May 18, 2004, which is herein incorporated by reference.

Figure 3:
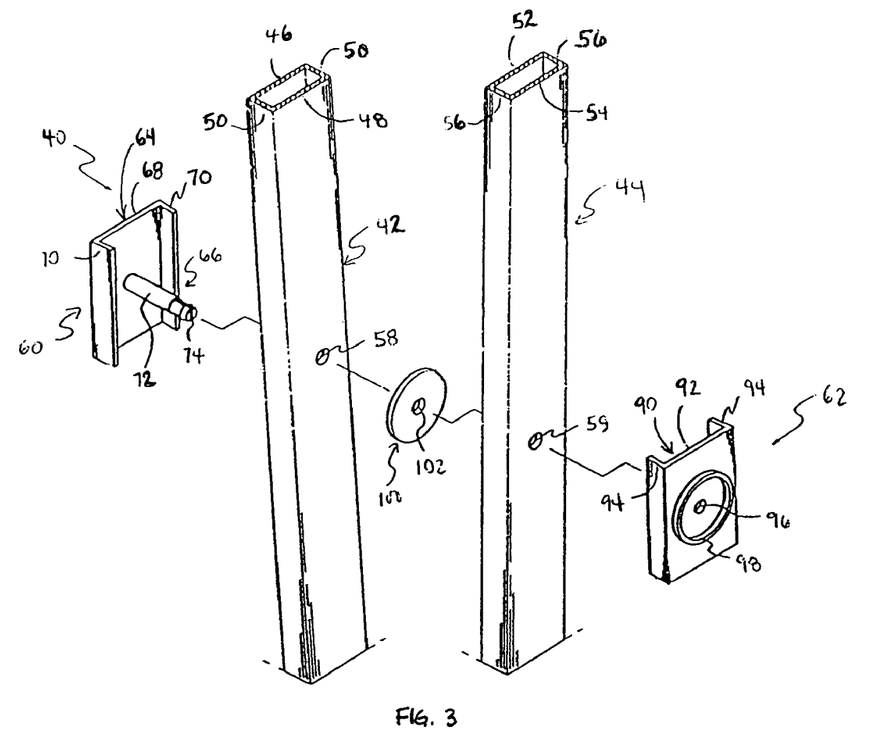
FIG. 3 is an exploded perspective view of a connector assembly and truss bars that are pivotally connected by use of the connector assembly in the collapsible canopy frame of FIG. 1.

FIG. 3 shows an exploded view of a connector assembly 40 for pivotally connecting a first truss bar 42 to a second truss bar 44. It is to be understood that the first and second truss bars 42 and 44 may be used as the truss bars 18 for any or all of the scissor units 16 in each edge scissor assembly 14, and that the first and second truss bars 42 and 44 may be used as the truss bars 18' for any or all of the scissor units 16' in each inner scissor assembly 30.

As shown in FIG. 3, the first truss bar 42 includes an outwardly facing surface 46, an inwardly facing surface 48 and side surfaces 50 extending therebetween. An opening 58 extends through the outwardly facing surface 46 and the inwardly facing surface 48. Similarly, the second truss bar 44 includes an outwardly facing surface 52, an inwardly facing surface 54 and side surfaces 56 extending therebetween. An opening 59 extends through the outwardly facing surface 52 and the inwardly facing surface 54.

In the depicted embodiment of FIG. 3 the first and second truss bars 42 and 44 are substantially rectangular in cross section, however in other embodiments the cross section of the first and second truss bars 42 and 44 may have other appropriate configurations.

The connector assembly 40 includes a fastener end 60 and a locking end 62. The fastener end 60 of the connector assembly 40 includes an end plate 64 having a fastener 66 extending therefrom. In the depicted embodiment of FIG. 3, the cover plate 64 is substantially U-shaped in cross section having a base surface 68 and opposing side arms 70 extending from the base surface 68. The fastener 66 includes a body portion 72 extending from the base surface 68 of the end plate 64 and a head portion 74 extending from the body portion 72. In the depicted embodiment of FIG. 3, the body portion 72 is generally cylindrical in shape and is concentric with the head portion 74, which is also generally cylindrical in shape. However, in other embodiments, the body portion 72 and the head portion 74 may have other appropriate shapes. As shown, the body portion 74 of the fastener 66 has a substantially smooth outer perimeter.

In one embodiment, the fastener 66 is a separate component part mounted to the end plate 64. In another embodiment, the fastener 66 and the end plate 64 are integrally formed, such as by a molding process or a molding process.

Figure 4:
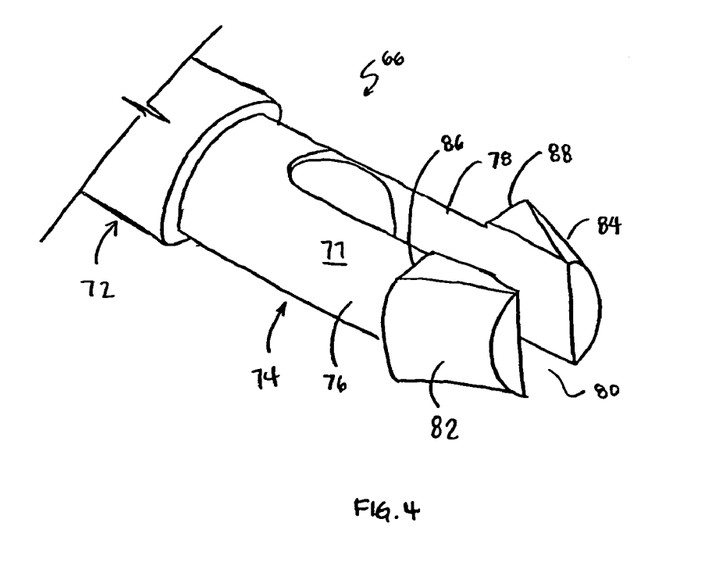
FIG. 4 is an enlarged perspective view of a fastener of the connector assembly of FIG. 3.

As shown in FIG. 4, the head portion 74 of the fastener 66 includes a first arm 76 and a second arm 78. The first and second arms 76 and 78 are separated by a longitudinally extending channel 80. For example, in FIG. 4 the channel 80 extends along a longitudinal axis of the fastener 66 to separate the ends of the first and second arms 76 and 78. The channel 80 allows the first and second arms 76 and 78 to be bent inwardly towards each other when an external force is applied thereto. As such, in one embodiment, the fastener 66 is composed of a material that is flexible enough to allow the first and second arms 76 and 78 to bend inwardly towards each other when an external force is applied thereto, but resilient enough and including a sufficient shape memory to return the first and second arms 76 and 78 to their original positions when the external force is released. In an exemplary embodiment, the fastener 66 is composed of a polymeric material, such as a plastic material. However in other embodiments, the fastener 66 may be composed of other suitable materials having the above described properties, for example a metal material or a composite material.

As shown in FIG. 4, the fastener arms 76 and 78 combine to form a generally cylindrical main body 77. As is also shown, the first arm 76 includes a first ramp 82 and the second arm 78 includes a second ramp 84. Each ramp 82 and 84 extends radially outwardly from the end of the fastener 66 toward the end plate 64 and connects with the main body 77 of the fastener arms 76 and 78 to form first and second shoulders 86 and 88. Although the main body 77 of the fastener arms 76 and 78 has been described as generally cylindrical in shape, the main body 77 of the fastener arms 76 and 78 may have any appropriate configuration as long as the first and second shoulders 82 and 84 laterally extend from the main body 77.

Referring back to FIG. 3, the locking end 62 of the connector assembly 40 includes a locking plate 90 having a substantially U-shaped cross section with a base surface 92 and opposing side arms 94 extending from the base surface 92. An opening 96 extends through the base surface 92. A wall 98 extends from the base surface 92 in the opposite direction from the side arms 94. The wall 98 encircles the locking plate opening 96. Although the wall 98 is shown as having a circular shape, in other embodiments the wall 98 may have any appropriate shape, as long as is at least partially encircles the locking plate opening 96.

As shown in FIG. 3, when it is desired to assemble the first truss bar 42 to the second truss bar 44, the fastener 66 is inserted into and through the first truss bar opening 58; the second truss bar opening 59; and the locking plate opening 96. The first and second truss bar openings 58 and 59 are each larger than the combined lateral dimension of the ramps 82 and 84 of the fastener arms 76 and 78.

However, the locking plate opening 96 is smaller than the combined lateral dimension of the ramps 82 and 84 of the fastener arms 76 and 78, yet larger than the main body 77 of the fastener arms 76 and 78. As such, when the fastener 66 is inserted into the locking plate opening 96, a circular sidewall that defines the locking plate opening 96 applies a compression force against the ramps 82 and 84 of the fastener arms 76 and 78 causing the arms 76 and 78 to bend inwardly toward each other. When the shoulders 86 and 88 of the fastener arms 76 and 78 have traversed the locking plate opening 96, the resiliency of the fastener arms 76 and 78 allows the fastener arms 76 and 78 to move outwardly away from each other, such that the shoulders 86 and 88 of the fastener arms 76 and 78 abut the base surface 92 of the locking end 62 to lock the fastener 66 to the second truss bar 44, thus pivotally mounting the first truss bar 42 to the second truss bar 44.

When the fastener 66 is so positioned, the ramps 82 and 84 of the fastener arms 82 and 84 are positioned adjacent to the locking plate wall 98. The locking plate wall 98, thus prevents inadvertent removal of the fastener 66 from the first and second truss bars 42 and 44. However, the locking plate wall 98 is sufficiently spaced from the ramps 82 and 84 of the fastener arms 76 and 78 to allow a tool or a person's fingers to extend between the locking plate wall 98 and the ramps 82 and 84 of the fastener arms 76 and 78 to apply a compression force against the ramps 82 and 84, causing the fastener arms 76 and 78 to bend inwardly towards each other, allowing the fastener 66 to be removed from the first and second truss bars 42 and 44.

Figure 5:
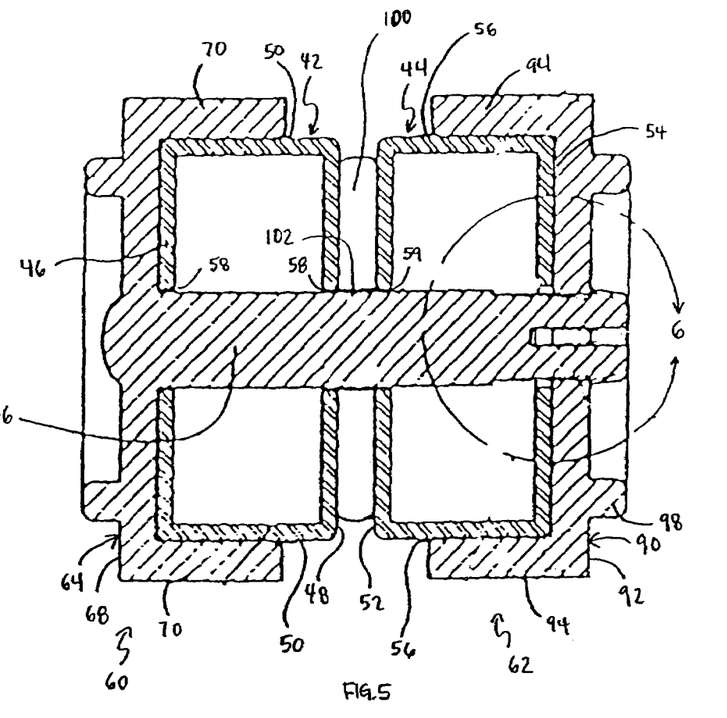
FIG. 5 is a cross sectional view of the connector assembly and the truss bars of FIG. 3, shown in an assembled condition.
Figure 6:
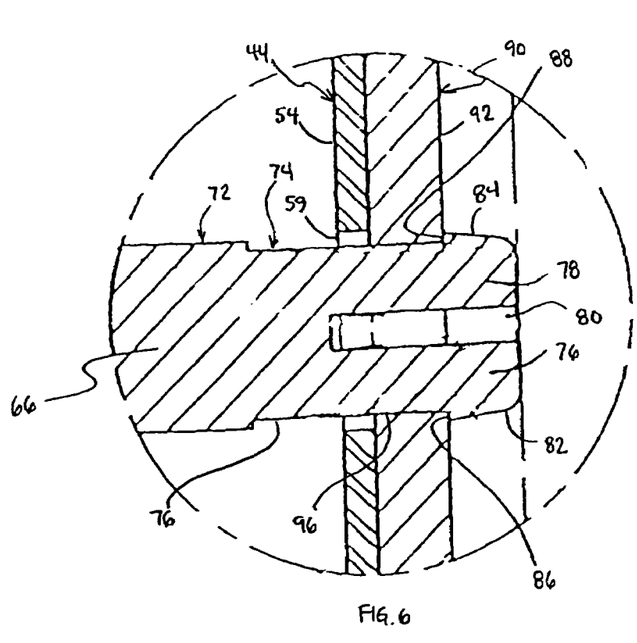
FIG. 6 is an enlarged view from the assembled drawing of FIG. 5, showing a locking of the fastener against a truss bar.

As shown in most clearly in FIGS. 3 and 5, at the fastener end 60 of the connector assembly 40, the lateral dimension of the end plate 64 is larger than the lateral dimension (or the end cross-section) of the fastener 66. This makes the fastener end 60 of the connector assembly 40 much easier to manipulate by a user's hand since the lateral dimension of the fastener end 60 of the connector assembly 40 would other wise be relatively small, making the fastener 66 easy to drop.

Also, as shown most clearly in FIG. 5, when the fastener end 60 of the connector assembly 40 is attached to the locking end 62 of the connector assembly 40 to pivotally connect the first truss bar 42 to the second truss bar 44, the side arms 70 of the end plate 64 of the connector assembly 40 extend adjacent to the sides surfaces 50 of the first truss bar 42, and the side arms 94 of the locking plate 90 of the connector assembly 40 extend adjacent to the sides surfaces 56 of the second truss bar 44. This prevents rotational movements of the fastener 66 with respect to the first truss bar 42 and the locking plate with respect to the second truss bar 44, thus preventing a relative movement between the fastener 66 and the locking plate 90, which increases the stability of the connection of the fastener 66 to the locking plate 90.

A washer 100 having an opening 102 extending therethrough is optionally placed between the inwardly facing surface 48 of the first truss bar 42 and the outwardly facing surface 52 of the second truss bar 44. The washer 100 helps reduce wear on the first and second truss bars 42 and 44. In such a case, the fastener 66 extends through the washer opening 102 to hold the washer 100 between the first and second truss bars 42 and 44.

It will be appreciated by those of ordinary skill in the art that the invention can be embodied in other specific forms without departing from the spirit or essential character thereof. The present invention is therefore considered in all respects to be illustrative and not restrictive. The scope of the invention is indicated by the appended claims, and all changes that come within the meaning and range of equivalents thereof are intended to be embraced therein.

I claim:

1. A collapsible canopy frame comprising:

a first truss bar having a surface that defines an opening;

a second truss bar having a surface that defines an opening that is aligned with the first truss bar opening; and a connector assembly that pivotally connects the first truss bar to the second truss bar, wherein the connector assembly comprises:

a locking plate at a second end of the connector assembly comprising a base that defines first and second base surfaces having an opening extending therebetween, wherein the first base surface abuts the second truss bar;

a fastener comprising a main body that extends through each of the first and second truss bar openings and the locking plate base opening and that contacts the first truss bar, wherein the fastener comprises spaced apart first and second arms each having a shoulder that laterally extends from the main body to abut the second base surface of the locking plate to pivotally couple the first truss bar to the second truss bar, wherein each arm comprises an angled portion extending from a tip of a corresponding one of the arms to an edge of a corresponding one of the shoulders to form a ramp; and an end plate integrally formed with the fastener and engaging the first truss bar, wherein the locking plate comprises a wall that extends from the second base surface of the locking plate and at least partially surrounds the angled portion of each arm.

2. The collapsible canopy frame of claim 1, wherein the end plate comprises a base that is connected to the fastener and laterally extends from the fastener to abut the first truss bar.

3. The collapsible canopy frame of claim 1, wherein the first and second arms are movable towards each other.

4. The collapsible canopy frame of claim 1, wherein the first and second arms each comprise a flexible, resilient material with shape memory.

5. The collapsible canopy frame of claim 1, wherein the main body of the fastener has a generally smooth outer surface.

6. The collapsible canopy frame of claim 1, wherein the first truss bar comprises a base and two side arms extending therefrom, and wherein the end plate comprises a base and two side arms extending therefrom, such that the base of the end plate abuts the base of the first truss bar and the side arms of the end plate abut corresponding ones of the side arms of the first truss bar.

7. The collapsible canopy frame of claim 1, wherein the second truss bar comprises a base and two side arms extending therefrom and wherein the locking plate comprises said locking plate base and two side arms extending therefrom, such that said locking plate base first surface abuts the base of the second truss bar and the side arms of the locking plate abut corresponding ones of the side arms of the second truss bar.

8. A collapsible canopy frame comprising:

a first truss bar having a surface that defines an opening;

a second truss bar having a surface that defines an opening that is aligned with the first truss bar opening; and a connector assembly that pivotally connects the first truss bar to the second truss bar, wherein the connector assembly comprises:

a locking plate at a second end of the connector assembly comprising a base that defines first and second base surfaces having an opening extending therebetween, wherein the first base surface abuts the second truss bar;

a fastener comprising a main body that extends through each of the first and second truss bar openings and the locking plate base opening and that contacts the first truss bar, wherein the fastener comprises spaced apart first and second arms each having a shoulder that laterally extends from the main body to abut the second base surface of the locking plate to pivotally connect the first truss bar to the second truss bar; and an end plate at a first end of the connector assembly comprising a base that is connected to the fastener and laterally extends from the fastener to engage the first truss bar, wherein the fastener and the end plate are integrally formed, wherein each arm comprises an angled portion extending from a tip of a corresponding one of the arms to an edge of a corresponding one of the shoulders to form a ramp, and wherein the locking plate comprises a wall that extends from the second base surface of the locking plate and at least partially surrounds the angled portion of each arm.

9. The collapsible canopy frame of claim 8, wherein the first and second arms are movable towards each other.

10. The collapsible canopy frame of claim 8, wherein the first and second arms each comprise a flexible, resilient material with shape memory.

11. The collapsible canopy frame of claim 8, wherein the main body of the fastener has a generally smooth outer surface.

12. The collapsible canopy frame of claim 8, wherein the first truss bar comprises a base and two side arms extending therefrom, and wherein the end plate comprises said end plate base and two side arms extending therefrom, such that the base of the end plate abuts the base of the first truss bar and the side arms of the end plate abut corresponding ones of the side arms of the first truss bar.

13. The collapsible canopy frame of claim 8, wherein the second truss bar comprises a base and two side arms extending therefrom and wherein the locking plate comprises said locking plate base and two side arms extending therefrom, such that said locking plate base first surface abuts the base of the second truss bar and the side arms of the locking plate abut corresponding ones of the side arms of the second truss bar.

14. The collapsible canopy frame of claim 8, further comprising a plurality of side poles arranged in a predetermined configuration and a plurality of edge scissor assemblies, wherein each edge scissor assembly is coupled between adjacent ones of the plurality of side poles.

15. The collapsible canopy frame of claim 14, wherein at least one of the plurality of edge scissor assemblies comprises said first truss bar pivotally connected to said second truss by said connector assembly.

16. The collapsible canopy frame of claim 14, further comprising a center pole disposed generally at a center of the configuration of the side poles and at least one inner scissor assembly comprising a first end and a second end, wherein the first end is coupled to a corresponding one of the edge scissor assemblies and the second end is coupled to the center pole.

17. The collapsible canopy frame of claim 16, wherein the at least one inner scissor assembly comprises said first truss bar pivotally connected to said second truss by said connector assembly.

18. A method of pivotally connecting a first truss bar to a second truss bar in a collapsible canopy frame comprising:

forming an opening in such first truss bar;

forming an opening in such second truss bar that is aligned with the opening in the first truss bar;

providing a connector assembly that pivotally connects the first truss bar to the second truss bar, wherein the connector assembly comprises:

an end plate comprising a base at a first end of the connector;

a fastener integrally formed with the end plate and extending from the base of the end plate and comprising a main body and spaced apart first and second arms each having a shoulder that laterally extends from the main body; and a locking plate at a second end of the connector assembly comprising a base that defines first and second surfaces having an opening extending therebetween, the locking plate comprising a wall that extends from the second base surface of the locking plate and at least partially surrounds the shoulder of each arm; and inserting the fastener arms into and through each of the first and second truss bar openings and the locking plate base opening, such that the end plate base engages the first truss bar, the locking plate base first surface abuts the second truss bar, the main body contacts the first truss bar, and the fastener shoulders abut the locking plate base second surface to pivotally connect the first truss bar to the second truss bar.

19. The method of claim 18, further comprising forming the first and second arms from a flexible, resilient material with shape memory.

20. The method of claim 18, further comprising providing the main body of the fastener with a generally smooth outer surface.

21. The method of claim 18, further comprising forming a ramp on each arm that extends from a tip of a corresponding one of the arms to an edge of a corresponding one of the shoulders.

* * * * *